United States Patent [19]

Watson et al.

[11] Patent Number: 5,059,405

[45] Date of Patent: Oct. 22, 1991

[54] PROCESS AND APPARATUS FOR PURIFICATION OF LANDFILL GASES

[75] Inventors: J. Richard Watson; Beryl Koplin, both of Atlanta, Ga.

[73] Assignee: Bio-Gas Development, Inc., Atlanta, Ga.

[21] Appl. No.: 282,309

[22] Filed: Dec. 9, 1988

[51] Int. Cl.$^5$ .................. B01D 53/36; B01D 53/34; C01B 31/20

[52] U.S. Cl. ......................... 423/210; 55/68; 423/437

[58] Field of Search ............. 423/437, 210, 247; 405/129; 166/246, 267; 55/68

[56] References Cited

U.S. PATENT DOCUMENTS

| | | | |
|---|---|---|---|
| 4,157,247 | 6/1979 | Collins, III et al. | 55/71 |
| 4,442,078 | 4/1984 | Jalan et al. | 423/230 |
| 4,462,814 | 7/1984 | Holmes et al. | 55/68 |
| 4,521,387 | 6/1985 | Broeker et al. | 423/230 |
| 4,681,612 | 7/1987 | O'Brien et al. | 55/68 |
| 4,704,146 | 11/1987 | Markbreiter et al. | 55/68 |
| 4,855,276 | 8/1989 | Osborne et al. | 423/230 |

OTHER PUBLICATIONS

Perry's Chemical Engineers' Handbook, 6th Ed. Perry et al., Eds., McGraw-Hill Book Co. 1984 pp. 26–21.
Hackh's Chemical Dictionary, 4th Ed. Julius Grant, McGraw-Hill Book Co. 1969 pp. 15,147.
Malik, V. A. et al., Electricity, Methane and Liquid Carbon Dioxide Production from Landfill Gas.

Primary Examiner—Jeffrey E. Russel
Attorney, Agent, or Firm—Hurt, Richardson, Garner, Todd & Cadenhead

[57] ABSTRACT

A process and apparatus for removing the impurities from a gas stream produced from a landfill such that essentially pure carbon dioxide and methane is recovered. After the landfill gas is mechanically dewatered, the gas is filtered of particulate solids and aerosols and purified by removing sulfur compounds using zinc oxide columns, removing halogens using activated alumina columns, removing hydrocarbons using activated charcoal columns, and oxidizing remaining impurities using potassium permanganate impregnated activated alumina columns. Lastly the gas is incinerated in a boiler/incinerator combustion furnace to produce an exit stream containing essentially pure carbon dioxide and air, which is further treated in a conventional carbon dioxide treatment process.

23 Claims, 1 Drawing Sheet

PROCESS AND APPARATUS FOR PURIFICATION OF LANDFILL GASES

BACKGROUND OF THE INVENTION

Plants processing landfill gases to produce high BTU methane gas suitable for use in commercial pipelines generally have a waste gas stream composed of very high purity carbon dioxide gas. There have been problems marketing the waste carbon dioxide for many reasons, not the least of which is its procurement from a source as obnoxious as a landfill. Another equally major problem is the high concentrations of corrosive compounds generated from trace components in the landfill gas. These compounds apparently are a common source of the recurring problems involving the short and long term failures of internal reciprocating engines. In order to assure the high quality purity of the carbon dioxide product, any carbon dioxide produced by landfill gases must be subjected to incineration and to the latest filtration, absorption, and scrubbing technologies available. To our knowledge, this has not been attempted.

In U.S. Pat. No. 4,521,387, gases containing carbon dioxide are purified by removing compounds, such as hydrogen sulfide, carbon disulfide, carbonyl sulfide, hydrogen cyanide, hydrochloric acid, and various carbonyls by catalytic reaction at elevated temperature. The gas to be purified is passed directly through a catalyst charge containing a copper zinc oxide catalyst. In U.S. Pat. No. 4,681,612, landfill gas is separated into a fuel grade methane stream and a carbon dioxide stream. The carbon dioxide stream is purified using a low temperature purification distillation column and then by treatment by adsorption or catalytic oxidation. In U.S. Pat. No. 4,704,146, landfill and other gases are separated into a high BTU fuel gas stream and a carbon dioxide stream. The carbon dioxide is purified by compressing and chilling the carbon dioxide to remove some impurities and by adsorbents and/or molecular sieves to remove other impurities.

In one published process, pretreated landfill gas, oxygen, and recycled exhaust gas are fed into an internal combustion engine where it is combusted. Prior to combustion, the landfill gas is dried and treated in a multiple bed activated carbon adsorption unit to remove heavy halogenated hydrocarbons and to reduce the overall chlorinated hydrocarbon level. Part of the exhaust gas from the internal combustion engine is cooled producing a gas stream with a carbon dioxide concentration in excess of 90%. Part of this cooled stream is sent to a gas scrubber where acid gases, such as sulfur dioxide and hydrochloric acid, are removed. This scrubbed gas is then sent to a merchant carbon dioxide plant.

In a related process, the landfill gas is pretreated by scrubbing with an aqueous iron chelated solution to remove hydrogen sulfide. The gas is then dried and then treated in a multiple bed adsorption unit containing activated carbon beds to adsorb the halogenated hydrocarbons, organic sulfurs, and many heavy hydrocarbons. The pretreated landfill gas is then separated into a methane-rich stream and a $CO_2$-rich stream. The carbon dioxide rich stream is combusted in an internal combustion engine. The exhaust gas from the engine is dewatered and scrubbed and then sent to a merchant carbon dioxide plant.

Each of these processes remove specific contaminants in gas or acid gas streams, but do not deal with the need to handle the widest range of possible trace compounds found in landfill gas. The process of the present invention employs a continuous step-by-step system which removes generally all of the impurities found in gases eminating from landfill gas.

SUMMARY OF THE INVENTION

It is a primary object of the present invention to provide a continuous step-by-step process which removes substantially all of the impurities found in a carbon dioxide stream recovered from landfill gas, leaving essentially pure $CO_2$.

It is another object of the present invention to provide an economical process for producing from gases containing carbon monoxide, carbon dioxide, methane, nitrogen and oxygen, essentially pure $CO_2$ and methane.

It is an additional object of the present invention to produce an efficient continuous process for automatically recovering gases from landfills and for thereafter automatically converting such gases into essentially pure $CO_2$.

It is a futher object of the present invention to provide a process for continuously removing impurities from a stream of gas containing $CO_2$, $N_2$ and $O_2$.

It is yet another object of the present invention to provide a high yield process for recovering of $CO_2$.

Briefly described, the above objectives are accomplished in accordance with the process of the present invention to yield essentially pure carbon dioxide suitable for human consumption, from landfill gas. Methane present in the landfill gas is used for power generation. In the process the initial landfill gas admixture, which usually contains about 40–60% methane and about 30–45% carbon dioxide together with nitrogen, oxygen, paraffins, aromatic and cyclic hydrocarbons, hydrogen, hydrogen sulfide, carbon monoxide, and other trace impurities and compounds, is progressively fed as a stream through successive chambers or columns, the initial chamber having a filter system where particle impurities are removed.

Thence, the gases progress through a series of columns which remove specific impurities. These columns can be arranged in a number of different orders depending on the plant layout or other factors. Additionally, there can be a redundancy of each set of columns or individual columns can be eliminated as necessary. In a typical set-up, the gases progress through a zinc oxide filter chamber where most of the sulfur compounds and sulfur dioxide are removed. Next, the gases pass through a filter containing activated alumina which adsorbs halogens. Thereafter, the gases pass through a filter containing activated carbon which removes the residual halogenated hydrocarbons, sulfur compounds, and carbon monoxide compounds. The gases then travel through an oxidizer where an alkali permanganate oxidizes the gases and also adsorbs or converts any hydrocarbons remaining in the gases into carbon dioxide and water vapors.

The resulting gas admixture, emerging from the peroxide filter chamber now consists essentially of about 45% carbon dioxide and about 55% methane. This gas is next diverted into two streams with about 60% going to power a plurality of internal combustion engines and about 40% going directly to a boiler/incinerator in admixture with the exhaust gases from the engines. In the internal combustion engines, the methane is converted to essentially carbon dioxide and water vapor through burning. The discharge from the internal combustion engines which is mixed with the methane/carbon dioxide stream may contain residual carbon monoxide which is further oxidized to carbon dioxide in the boiler/incinerator so that essentially clean carbon dioxide with traces of $N_2$, $O_2$ and water vapor, is discharged from the incinerator.

The gas stream thus produced is treated in generally a conventional way in subsequent successive steps which involve compressing the gas stream to remove water, purifying the gas stream by passing it successively through an activated alumina dryer, an activated carbon adsorber, filters to remove dust, aluminum oxide, and carbon from the previous filters, and then compressing the $CO_2$ stream for storage in a liquified condition in a storage tank.

Other objects, features and advantages of the present invention will become apparent from the following disclosure.

DETAILED DESCRIPTION OF THE INVENTION

Figure 1:
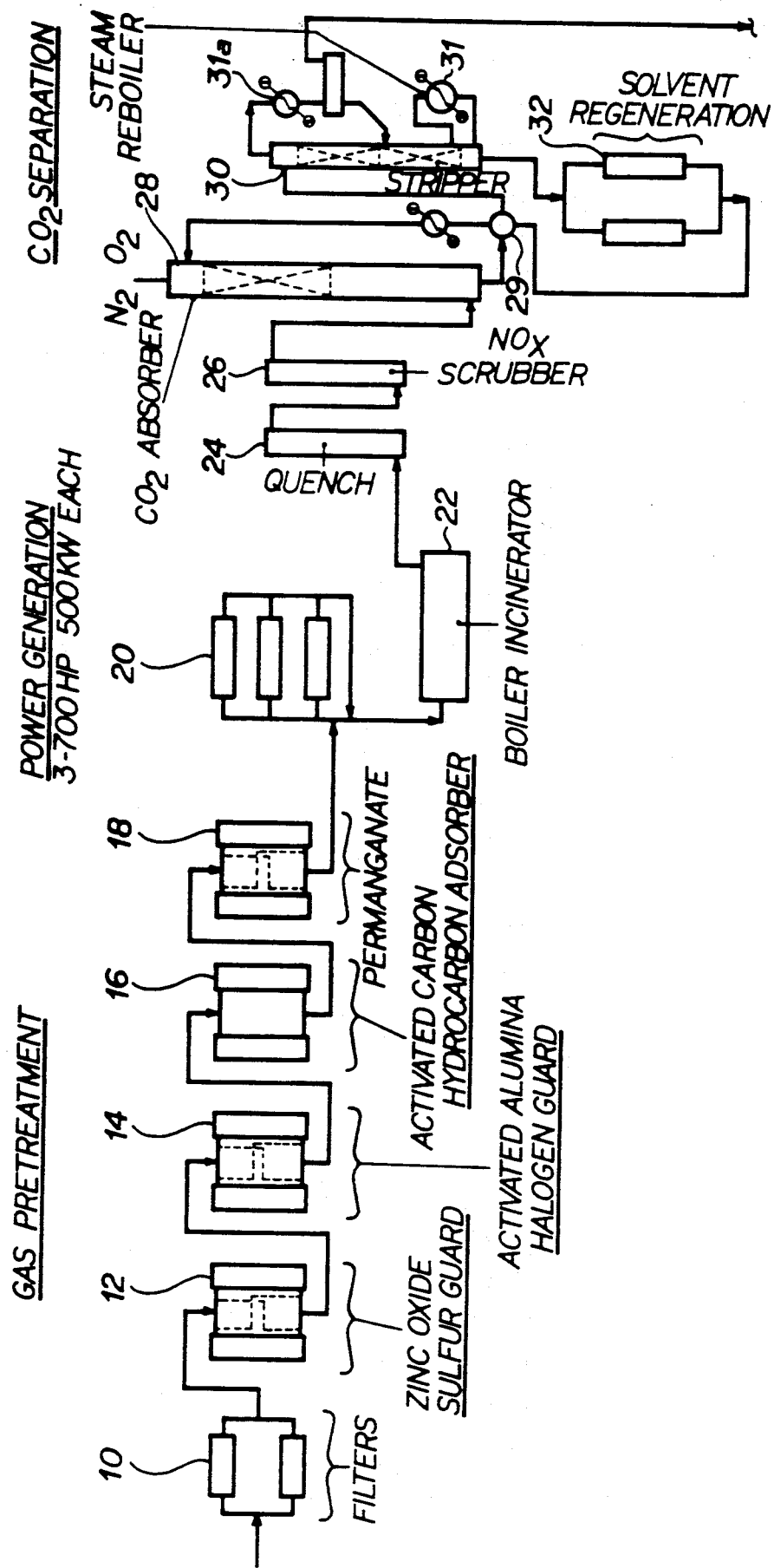
FIG. 1 is a schematic of the pretreatment process of the present invention coupled to a conventional carbon dioxide separation apparatus.

The process of the present invention is more fully explained by the following description in reference to FIG. 1.

Landfill gas typically is initially dewatered mechanically in the gas collection system to eliminate water blockage of the subsequent gas flow, as well as to return condensate to the landfill prior to exposure to the processing equipment being subjected to the gas. Returning the condensate to the landfill also normally enhances gas production. Further, exposure of the condensate to the processsing equipment may have detrimental effects on the equipment. Any additional moisture removal is accomplished prior to treatment by standard methods such as adsorption in vessels packed with desiccants such as silica gel, alumina, or molecular sieves, impingement in baffled or packed vessels, or condensation by cooling the gas and passing it through baffled or packed vessels wherein the water condenses out.

Pretreatment

The entire pretreatment stage and all of the apparatuses which are part of the pretreatment stage operate at from about 80° F. to about 150° F. and from about 15 psig to about 400 psig with the gas being directed through conduits from one stage to the next.

In the present process, the landfill gas stream, which typically contains 40%–60% $CH_4$, 30%–45% $CO_2$, 1%–3% $O_2$, 3%–10% $N_2$, by volume, and various trace impurities, is fed along a prescribed path through a filter chamber 10 containing filtered parallel HEPA filters which progressively remove solids and aerosol particles from the gas. The gas stream remains in the filter chamber 10 for about 1 millisecond. The filters are usually serviced as often as weekly to remove the accumulated solids. Filtration efficiency of at least 99.95% is normal for this equipment.

The particle-free gas stream is next progressively fed through a sulfur removal column 12 containing a low temperature zinc oxide adsorption guard bed to remove sulfur compounds. The gas stream remains in the zinc oxide columns 12 for about 0.5 to about 2.0 seconds. Two columns 12 in series are employed, with testing accomplished between the two. When breakthrough occurs in one column 12, that column is to be valved out, and the packing replaced. The remaining column 12 becomes the upstream column 12. These columns 12 cannot be regenerated in place.

From columns 12, the gas is progressively fed to series arranged activated alumina columns 14. In these columns 14, the alumina progressively removes the halogens which may be present. The gas stream remains in contact with the activated alumina of columns 14 for about 0.5 to about 2.0 seconds. These columns 14 cannot be regenerated in place.

The gas from the activated alumina columns 14 is then fed to the hydrocarbon absorbers which in the present invention includes a pair of activated carbon columns 16 and a pair of alkali (potassium) permanganate columns 18. The heavy hydrocarbons, such as halogenated hydrocarbons, as well as carbon monoxide and any remaining sulfur compounds are then adsorbed by activated charcoal beds in columns 16, employing two beds in parallel. The gas stream remains in the activated charcoal columns 16 for about 0.5 to about 2.0 seconds. These activated carbon beds can be regenerated in place using steam or a hot inert gas. One column is on line while the other is being regenerated. This unit can be operated automatically on a pre-set timed sequence.

Final pretreatment in the hydrocarbon adsorbers removes additional impurities, such as hydrogen sulfide and carbonal sulfide, and is accomplished using the two columns 18 in series, each of which is packed with activated alumina impregnated with potassium permanganate. This permanganate absorber oxidizes practically all possible contaminents and adsorbs or converts remaining hydrocarbons. Like the sulfur and halogen guard beds, the alumina/permanganate beds of columns 18 cannot be regenerated in place. The gas stream remains in the alkali permanganate columns 18 for about 0.5 to about 2.0 seconds.

Power Generation and Incineration

The resulting gas admixture leaving the pretreatment stage is composed of about 45% $CO_2$ and about 55% $CH_4$. This stream is divided into two streams with about 60% being introduced as fuel into the internal combustion engines denoted by numerals 20. The about 40% stream is introduced as part of the fuel fed to the boiler/incinerator 22. In the internal combustion engines 20 the methane is converted to $CO_2$ and water vapors by burning (oxidation), generating power.

The hot exhaust gases (900°–1000° F.) from the engines 20 form the remainder of the fuel for the boiler/incinerator furnace 22, these exhaust gases being premixed with the 40% stream and combustion air. This fuel mixture is introduced into the boiler/incinerator combustion furnace 22. Typical boiler oxygen trim instrumentation are used to control excess air to insure complete combustion of the methane and carbon monoxide to carbon dioxide and water vapor. This furnace system typically operates at from about 1 to about 5 inches of water below atmospheric and at about 1600° to about 2000° F. The gas remains in the boiler/incinerator furnace 22 for about 0.5 to about 1.0 seconds. The flue gases leaving the boiler/incinerator furnaces 22 are at about 350° to about 450° F. and contain about 14 to about 17% carbon dioxide on a dry volume basis, the remainder of the gases are oxygen and nitrogen, due to the requirement for an excess of air in the combustion process.

Carbon Dioxide Separation

The boiler exhaust gases are next progressively fed to a quencher 24 where they are cooled with water, the water being at about 70° to about 90° F. The cooled gases, which are now about 90°–110° F., are thereafter passed through a scrubber 26 where the gases are progressively scrubbed with a caustic solution such as Ca(-CO$_3$)$_2$ or Ca(OH)$_2$), to remove nitrogen oxides and other possible water soluble compounds. The gas, now saturated with water, enters the bottom of a counterflow packed tower 28 and is contacted with a solvent, such as, for example, from about 12% to about 30% amine solution, or any of the ethanolamines in solution flowing down the tower 28. Preferably monoethanolamine or diethanolamine or a mixture of the two are used for the amine solution. Other well known liquid or gaseous CO$_2$ absorbers may be used. The carbon dioxide is then adsorbed in the amine solution, and inert gases are exhausted to the atmosphere.

The CO$_2$ rich amine solution is then pumped to the top of a stripper column 30, where carbon dioxide stripping is accomplished, thermally. The use of a steam generated reboiler 31 supplies heat to the amine solution which is circulating through the reboiler 31. The stripped amine solution is then passed through a pair of solvent regeneration column 32 where filters and charcoal absorbers regenerate the amine solution which is then reused in the stripper column 30 after first passing through tower 28. Heat recovery is accomplished using heat exchanger 29. The carbon dioxide saturated amine exits the top of the column 30 and is cooled by heat exchange with water in heat exchanger 31a, the condensed amine solution being removed and returned to the stripper column 30.

The now relatively pure gaseous carbon dioxide, greater than 99.5% pure CO$_2$, passes through a water wash 34 and then through a knock out drum 36 in which the free water is separated from the carbon dioxide. The relatively dry carbon dioxide is next compressed progressively to from about 90 psig to about 110 psig in the first stage 38 of a multi stage compressor. The heat generated in compression is removed by exchange with chilled water to reduce the temperature of the gas to about 36° to about 40° F. After leaving first stage 38, the gas is cooled in heat exchanger 39 to condense additional free water. The additional free water condensed from the gas is then separated by gravity in a second knock out drum 40. Thereafter, the CO$_2$ gas is again compressed to about 260 psig to about 280 psig in the second stage 42 of the compressor, followed by heat exchanging with water in heat exchanger 43, the gas then passing through a second heat exchanger 45 to reduce its temperature again to from about 36° to about 40° F. The gas is then directed to a third knock out drum 44 where any water remaining in the gas is then separated by gravity. The dewatered gas is then dried still further in a parallel automatically cycled, activated alumina/molecular seive dryer columns 46.

The final residual impurities in the CO$_2$ gas are thereafter adsorbed in the adsorbtion beds of parallel automatically cycled, activated charcoal columns 48. Next the gas travels progressively through parallel particulate filters 50, to remove any dust generated from the solid packings in the adsorber columns 48 and 50. The gas stream is still at about 275 psig and at about 36°--40° F.

The relatively warm gas, thence, passes as a heat source through a shell and tube heat exchanger 51a located in the bottom of a reboiler 51 of a column 52 having a reflux condenser column 52a and purge condenser 52b. In the heat exchanger 51a the compressed CO$_2$ gives up its heat to the liquid carbon dioxide contained within the reboiler 51, thereby boiling off any occluded or dissolved higher boiling inerts in the liquid gas. These inert gases and a small amount of carbon dioxide of the liquid gas in the reboiler 51 pass upwardly through the plates of the reflux condenser column 52a and are vented from the top of the column 52.

The CO$_2$ gas, which after giving up some of its heat, emerges from the tubes of the heat exchanger 51a, and is then condensed in a second heat exchanger 54a by a refrigerant. Thereafter the CO$_2$ is directed either into the top of the purge condenser 52b located at the top of column 52 and which is supplied with a refrigerant or onto the first plate of the reflux condensor column 52a just below the purge condenser 52b. The then liquid carbon dioxide flows downward through the plates of the column 52 and accumulates in the reboiler 51.

At this stage, the carbon dioxide is essentially pure and is introduced through a subcooler 54 where it is sub-cooled to about $-15°$--$-20°$ F. by refrigerant in heat exchange 54b. After sub-cooling, the CO$_2$ enters one of a plurality of batch test tanks 56. When each tank 56 is full the liquid CO$_2$ is sampled and tested, and pumped into the main storage tank 58 if found acceptable. The test tanks 56 will store about 12 hours production.

Instrumentation and Testing Procedures

Continuous monitoring devices, primarily gas chromatographs, are employed to detect contaminents. In addition, testing is continuous at the inlet of the first stage 38 of the carbon dioxide compressor, and the process is automatically valved to vent if contaminents are detected at this point.

It will be obvious to those skilled in the art that many variations may be made in the embodiment here chosen for the purpose of illustrating the present invention without departing from the scope of the appended claims.

What is claimed is:

1. In a process for removing the impurities from landfill gas mixtures, comprising the steps of:
   (a) dewatering said gas mixture;
   (b) filtering solids and aersols from said gas mixture using a HEPA filter;
   (c) adsorbing sulfur compounds from said gas mixture;
   (d) removing halogens from said gas mixture;
   (e) adsorbing hydrocarbons from said gas mixture;
   (f) oxidizing any remaining impurities which can be oxidized from said gas mixture; and
   (g) incinerating said gas mixture thereby producing an exit stream from said process consisting of CO$_2$, O$_2$, and N$_2$ and water, the collective molar purity which is not less than 99.99%.

2. A process as claimed in claim 1 wherein said dewatering is accomplished by mechanical means, adsorption, or condensation.

3. A process as claimed in claim 1 wherein said filter means includes a second HEPA filter in parallel with the first mentioned HEPA filter.

4. A process as claimed in claim 1 wherein said sulfur adsorbing means is a zinc oxide adsorption column.

5. A process as claimed in claim 4 including a second zinc oxide adsorption guard bed column in series with said zinc oxide adsorption column.

6. A process as claimed in claim 1 wherein said halogens removing means is a column packed with an activated alumina.

7. A process as claimed in claim 6 including a second activated alumina column in series with said activated alumina column.

8. A process as claimed in claim 1 wherein said hydrocarbon adsorbing means is an activated charcoal column.

9. A process as claimed in claim 8 including a second activated charcoal column in parallel with said activated charcoal column.

10. A process as claimed in claim 1 wherein said oxidizing means is a column packed with potassium permanganate impregnated activated alumina.

11. A process as claimed in claim 10 including a second potassium permanganate impregnated activated alumina column in series with said column.

12. A process as claimed in claim 4, wherein said gas mixture remains in said column for about 0.5 to about 2.0 seconds.

13. A process as claimed in claim 1 wherein said incinerating step occurs in a boiler/incinerator combustion furnace.

14. A process as claimed in claim 13 wherein said boiler/incinerator combustion furnace operates at from about 1 to about 5 inches of water below atmospheric.

15. A process as claimed in claim 1 wherein said gas mixture is incinerated for about 0.5 to about 1.0 second at a temperature from about 1600° to about 2000° F.

16. A process as claimed in claim 1 wherein said exit stream consists of from about 14% to about 17% $CO_2$ on a dry volume basis.

17. A process as claimed in claim 1 wherein steps (a) through (f) occur at from about 80° to about 150° F. and from about 15 psig to about 400 psig.

18. A process as claimed in claim 1 wherein said exit stream from said process is introduced to a $CO_2$ processing system.

19. A process for removing the impurities from landfill gas mixture, comprising:
(a) dewatering said gas mixture by adsorption, impingement, or condensation;
(b) filtering solids and aerosols from said gas mixture using two parallel HEPA filters;
(c) adsorbing sulfur compounds from said gas mixture using two zinc oxide adsorption columns in series;
(d) removing halogens from said gas mixture using two columns in series packed with an activated aluminum guard;
(e) adsorbing hydrocarbon from said gas mixture using two activated charcoal columns in parallel;
(f) oxidizing all remaining impurities from said gas mixture using two columns in parallel packed with potassium permanganate impregnated activated alumina;
(g) incinerating said gas mixture thereby producing an exit stream consisting of from about 14% to about 17% $CO_2$ on a dry volume basis, $O_2$, $N_2$ and water, the collective molar purity of which is not less than 99.99%; and
(h) introducing said exit stream into a $CO_2$ processing system.

20. A process as claimed in claim 19 wherein steps (a) through (f) occur at from about 80° to about 150° F. and from about 15 to about 400 psig.

21. A process as claimed in claim 19 wherein said gas mixture remains in each of said columns for about 0.5 to about 2.0 seconds.

22. A process as claimed in claim 20 wherein said incineration in step (g) occurs in a boiler/incinerator combustion furnace for about 0.5 to about 1.0 seconds at a temperature from about 1600° F. to about 2000° F.

23. A process for removing the impurities from landfill gas mixtures, comprising:
(a) dewatering said gas mixture by mechanical means, adsorption, or condensation;
(b) filtering solids and aerosols from said gas mixture using a high efficiency particulate filter;
(c) adsorbing sulfur compounds from said gas mixture using zinc oxide;
(d) removing halogens from said gas mixture using activated alumina;
(e) adsorbing hydrocarbons from said gas mixture using activated charcoal;
(f) oxidizing remaining impurities in said gas mixture using potassium permanganate; and
(g) incinerating said gas mixture thereby producing an exit stream comprising $CO_2$, $O_2$ and $N_2$, the collective molar purity of which is not less than 99.99%.

* * * * *